United States Patent
Ishii et al.

(10) Patent No.: US 10,916,764 B2
(45) Date of Patent: Feb. 9, 2021

(54) NONAQUEOUS ELECTROLYTE SECONDARY CELL (71) Applicant: TOYOTA JIDOSHA KABUSHIKI KAISHA, Toyota (JP)

(72) Inventors: Kenta Ishii, Seto (JP); Masahiro Morita, Nagoya (JP); Shusaku Goto, Hamamatsu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 108 days.

(21) Appl. No.: 16/214,853

(22) Filed: Dec. 10, 2018

(65) Prior Publication Data
US 2019/0181429 A1 Jun. 13, 2019

(30) Foreign Application Priority Data

Dec. 11, 2017 (JP) ................................. 2017-236795

(51) Int. Cl.
*H01M 4/136* (2010.01)
*H01M 4/525* (2010.01)
(Continued)

(52) U.S. Cl.
CPC ........... *H01M 4/136* (2013.01); *H01M 4/131* (2013.01); *H01M 4/133* (2013.01); *H01M 4/505* (2013.01);
(Continued)

(58) Field of Classification Search
None
See application file for complete search history.

(56) References Cited

U.S. PATENT DOCUMENTS

2012/0308881 A1 12/2012 Tokuda et al.
2016/0211553 A1 7/2016 Ito et al.
(Continued)

FOREIGN PATENT DOCUMENTS

EP 3454396 A1 3/2019
JP 2011-187440 A 9/2011
(Continued)

OTHER PUBLICATIONS

Communication dated Jun. 8, 2020, from the United States Patent and Trademark Office in U.S. Appl. No. 16/214,948.
(Continued)

*Primary Examiner* — Jonathan Crepeau
(74) *Attorney, Agent, or Firm* — Sughrue Mion, PLLC (57) ABSTRACT According to the present invention, there is provided a technique making it possible to improve suitably the performance of a nonaqueous electrolyte secondary cell in which a SEI film is formed on the surface of a negative electrode active material. The nonaqueous electrolyte secondary cell disclosed herein includes a positive electrode 10, a negative electrode 20, and a nonaqueous electrolytic solution, wherein a negative electrode SEI film 29 including at least a LiBOB skeleton and a fluorosulfonic acid skeleton is formed on the surface of a negative electrode active material 28, and a positive electrode SEI film 19 including at least a phosphoric acid skeleton is formed on the surface of a positive electrode active material 18. Where the component amount of the LiBOB skeleton in the negative electrode SEI film 29 is denoted by $I_B$, the component amount of the fluorosulfonic acid skeleton in the negative electrode SEI film 29 is denoted by $I_S$, and the component amount of the phosphoric acid skeleton in the positive electrode SEI film 19 is denoted by $I_P$, a formula (1) represented by $4 \leq I_B/I_S \leq 10$ and a formula (2) represented by
(Continued)

5 µmol/m² ≤ $I_P$ ≤ 15 µmol/m² are satisfied. Furthermore, the BET specific surface area of the negative electrode active material is 3.5 m²/g or more and 5.0 m²/g or less, and the component amount $I_B$ of the LiBOB skeleton is 4.3 µmol/m² or more.

2 Claims, 6 Drawing Sheets

(51) Int. Cl.

| | | |
|---|---|---|
| *H01M 10/0567* | (2010.01) | |
| *H01M 10/0525* | (2010.01) | |
| *H01M 4/58* | (2010.01) | |
| *H01M 4/133* | (2010.01) | |
| *H01M 4/131* | (2010.01) | |
| *H01M 4/587* | (2010.01) | |
| *H01M 4/505* | (2010.01) | |
| *H01M 4/36* | (2006.01) | |
| *H01M 4/62* | (2006.01) | |
| *H01M 4/02* | (2006.01) | |

(52) U.S. Cl.
CPC ......... *H01M 4/525* (2013.01); *H01M 4/5805* (2013.01); *H01M 4/587* (2013.01); *H01M 4/628* (2013.01); *H01M 10/0525* (2013.01); *H01M 10/0567* (2013.01); *H01M 4/366* (2013.01); *H01M 2004/021* (2013.01); *Y02E 60/10* (2013.01)

(56) References Cited

U.S. PATENT DOCUMENTS

| | | |
|---|---|---|
| 2016/0226106 A1 | 8/2016 | Minami et al. |
| 2016/0380303 A1 | 12/2016 | Minami et al. |
| 2017/0222268 A1 | 8/2017 | Abe et al. |
| 2019/0013543 A1 | 1/2019 | Tao et al. |
| 2019/0181453 A1 | 6/2019 | Ishii et al. |
| 2019/0181455 A1 | 6/2019 | Ishii et al. |

FOREIGN PATENT DOCUMENTS

| | | |
|---|---|---|
| JP | 2015-37012 A | 2/2015 |
| JP | 2015-125858 A | 7/2015 |
| JP | 2016-27574 A | 2/2016 |
| JP | 2016-143454 A | 8/2016 |
| JP | 2016146341 A | 8/2016 |
| JP | 2016-184462 A | 10/2016 |
| JP | 2017-10819 A | 1/2017 |
| WO | 2016/009994 A1 | 1/2016 |

OTHER PUBLICATIONS

U.S. Appl. No. 16/214,948, filed Dec. 10, 2018.
Communication dated Oct. 9, 2020, from the United States Patent and Trademark Office in U.S. Appl. No. 16/214,948.

NONAQUEOUS ELECTROLYTE SECONDARY CELL

BACKGROUND OF THE INVENTION

1. Field of the Invention

The present invention relates to a nonaqueous electrolyte secondary cell. More specifically, the present invention relates to a nonaqueous electrolyte secondary cell including a positive electrode, a negative electrode, and a nonaqueous electrolytic solution. The present application claims priority based on Japanese Patent Application No. 2017-236795 filed on Dec. 11, 2017, the entire contents of which are incorporated herein by reference.

2. Description of the Related Art

In recent years, nonaqueous electrolyte secondary cells such as lithium ion secondary cells have been suitably used as so-called portable power sources for personal computers and portable terminals and power sources for driving vehicles. Among such nonaqueous electrolyte secondary cells, lithium-ion secondary cells that are lightweight and capable of obtaining high energy density have gained particular importance as high-output power sources (for example, a power source for driving a motor connected to the driving wheel of a vehicle) suitable for vehicles such as electric vehicles and hybrid vehicles.

In such a nonaqueous electrolyte secondary cell (hereinafter also simply referred to as "cell"), a part of the nonaqueous electrolytic solution (hereinafter also simply referred to as "electrolytic solution") is decomposed at the time of initial charge, and a coating film called a solid electrolyte interface (SEI) film may be formed on the surface of the negative electrode active material. When this SEI film is formed, the negative electrode is stabilized, so that subsequent decomposition of the electrolytic solution is suppressed.

However, since the decomposition of the electrolytic solution is an irreversible reaction, it causes a decrease in cell capacity. For this reason, in recent years, various techniques for adding in advance an additive which decomposes at or below the decomposition potential of the electrolytic solution to form an SEI film (hereinafter referred to as "film forming agent") and forming the SEI film derived from the film forming agent on the surface of the negative electrode active material have been suggested.

For example, Japanese Patent Application Publication No. 2016-184462 discloses a nonaqueous electrolytic solution including lithium bis(oxalato)borate (hereinafter also referred to as "LiBOB") as a film forming agent. In addition to this LiBOB, the nonaqueous electrolytic solution disclosed in Japanese Patent Application Publication No. 2016-184462 includes lithium hexafluorophosphate, a salt having an F—S bond in a molecule, and a salt having a P—F bond in a molecule (except for lithium hexafluorophosphate).

SUMMARY OF THE INVENTION

Incidentally, in recent years, there has been an increasing demand for improvement in cell performance of a nonaqueous electrolyte secondary cell so that the cell could be used more suitably for a high-output power source for vehicles and the like. It is also desirable that the technique of forming the SEI film derived from the film forming agent (LiBOB) be improved for further improvement of cell performance.

The present invention has been accomplished in response to such a demand, and it is an object of the present invention to provide a technique that can more suitably improve the performance of a nonaqueous electrolyte secondary cell in which a LiBOB-derived SEI film is formed on the surface of a negative electrode active material.

In order to achieve the above object, a nonaqueous electrolyte secondary cell having the following configuration is provided as one aspect of the present invention.

The nonaqueous electrolyte secondary cell disclosed herein includes a positive electrode having a positive electrode active material made of a lithium transition metal complex oxide, a negative electrode having a negative electrode active material made of a carbon material, and a nonaqueous electrolytic solution including a nonaqueous solvent and a supporting salt.

In such a nonaqueous electrolyte secondary cell, a negative electrode SEI film including at least a LiBOB skeleton and a fluorosulfonic acid skeleton is formed on a surface of the negative electrode active material, and a positive electrode SEI film including at least a phosphoric acid skeleton is formed on a surface of the positive electrode active material.

Further, in the nonaqueous electrolyte secondary cell disclosed herein, where the component amount of the LiBOB skeleton in the negative electrode SEI film is denoted by $I_B$, the component amount of the fluorosulfonic acid skeleton in the negative electrode SEI film is denoted by $I_S$, and the component amount of the phosphoric acid skeleton in the positive electrode SEI film is denoted by $I_P$, the following formulas (1) and (2) are satisfied, the BET specific surface area of the negative electrode active material is 3.5 m$^2$/g or more and 5.0 m$^2$/g or less, and the component amount $I_B$ of the LiBOB skeleton is 4.3 μmol/m$^2$ or more.

$$4 \leq I_B/I_S \leq 10 \tag{1}$$

$$5\ \mu mol/m^2 \leq I_P \leq 15\ \mu mol/m^2 \tag{2}$$

The inventors of the present invention have conducted comprehensive research in order to more suitably improve the cell performance of a nonaqueous electrolyte secondary cell in which an SEI film is formed by a film forming agent (LiBOB) as compared with the conventional cells.

As a result of such research, it was found that in a cell in which a LiBOB-derived SEI film is formed, there is a trade-off relationship with the component amount of LiBOB. Specifically, as described above, since LiBOB is a film forming agent for preventing a decrease in cell capacity due to SEI film formation, when the component amount of the LiBOB skeleton in the SEI film decreases, decomposition reaction of the electrolytic solution may proceed and the cell capacity may decrease. Meanwhile, the inventors of the present invention have found that where the component amount of the LiBOB skeleton in the SEI film becomes too large, the cell resistance may rise. This is because where the component amount of the LiBOB skeleton becomes too large, the movement speed of Li ions on the surface of (or inside) the SEI film decreases.

The inventors of the present invention considered creating a technique capable of solving the above-mentioned trade-off relationship, that is, a technique capable of forming an SEI film which includes sufficient amount of LiBOB but in which the decrease in the movement speed of Li ions by LiBOB is suitably suppressed. Then, as a result of various experiments and studies, it was found that when a fluorosulfonic acid skeleton is present in the SEI film, the movement speed of Li ions in the SEI film increases.

Based on these findings, the inventors of the present invention considered adjusting the ratio of the "component amount $I_B$ of the LiBOB skeleton" and the "component amount $I_B$ of the fluorosulfonic acid skeleton" in the SEI film formed on the surface of the negative electrode active material (hereinafter referred to as "negative electrode SEI film") and came up with the idea of forming a negative electrode SEI film in which $I_B/I_S$ is adjusted so as to satisfy the above formula (1).

Further, the inventors of the present invention have also conducted an investigation aimed at further performance improvement of nonaqueous electrolyte secondary cells in addition to the improvement described above.

As a result, the inventors of the present invention have found that in a general nonaqueous electrolyte secondary cell, when a transition metal element is eluted from a positive electrode active material (lithium transition metal complex oxide) and precipitates on the surface of a negative electrode active material, the reaction resistance at the negative electrode increases. Then, the inventors thought that a nonaqueous electrolyte secondary cell having higher performance could be provided if the elution of the transition metal element from the positive electrode active material could be prevented.

As a result of subsequent comprehensive investigation, it has been found that by forming an SEI film on the surface of a positive electrode active material (hereinafter referred to as "positive electrode SEI film") and causing a phosphoric acid skeleton to be present in the positive electrode SEI film, the elution of the transition metal element from the positive electrode active material could be prevented.

However, it was understood that when a positive electrode SEI film including such a phosphoric acid skeleton is actually formed, where the positive electrode SEI film is formed in excess, there is a possibility that the movement speed of Li ions in the positive electrode will decrease and the cell resistance will increase.

Therefore, the inventors of the present invention have performed repeated testing to investigate a positive electrode SEI film capable of suitably preventing the elution of a transition metal element and also ensuring the movement speed of Li ions, and came up with an idea of forming a positive electrode SEI film in which the component amount ($I_P$) of the phosphoric acid skeleton was adjusted to satisfy the above formula (2).

Furthermore, in order to provide a nonaqueous electrolyte secondary cell having a more suitable cell performance, the inventors of the present invention conducted research focusing on the specific surface area of the negative electrode active material.

Specifically, in a nonaqueous electrolyte secondary cell, a negative electrode active material having a large specific surface area may be used in order to reduce the reaction resistance at the negative electrode. However, a problem is that when the specific surface area of the negative electrode active material is excessively increased, the nonaqueous electrolytic solution is likely to be decomposed and the cell capacity deteriorates. The inventors of the present invention additionally investigated the relationship between the specific surface area of the negative electrode active material and the deterioration of cell capacity and found that, in the cell in which a LiBOB-derived negative electrode SEI film is formed, not only the specific surface area of the negative electrode active material but also the component amount $I_B$ of the LiBOB influences the decomposition of the nonaqueous electrolytic solution. Based on this finding, the inventors came up with an idea of adjusting the ratio of the component amount $I_S$ of the LiBOB skeleton to the specific surface area of the negative electrode active material.

Further, as a result of repeated testing conducted on the basis of this finding, it was found that where a negative electrode SEI film having a component amount $I_B$ of the LiBOB skeleton of 4.3 μmol/m$^2$ or more is formed in a cell satisfying the formulas (1) and (2), deterioration of cell capacity due to decomposition of the electrolytic solution can be suitably suppressed even when a negative electrode active material having a large specific surface area of 3.5 m$^2$/g or more and 5.0 m$^2$/g or less, as a BET specific surface area, is used, thereby making it possible to obtain excellent results in terms of both the reaction resistance and the cell capacity.

Further, in the nonaqueous electrolyte secondary cell disclosed herein, as described above, a fluorosulfonic acid skeleton is present in the negative electrode SEI film. As a result, the effect of using the negative electrode active material having a large specific surface area can be exhibited particularly suitably.

Specifically, as described above, when a negative electrode active material having a large specific surface area is used, the effect of lowering the reaction resistance of the negative electrode is obtained. However, when the LiBOB skeleton is contained in the negative electrode SEI film, the movement speed of Li ions is lowered by the LiBOB skeleton, so that despite the use of the negative electrode active material having a large specific surface area, the reaction resistance is difficult to reduce suitably.

In contrast, not only the LiBOB skeleton but also the fluorosulfonic acid skeleton is present in the negative electrode SEI film of the nonaqueous electrolyte secondary cell disclosed herein. Since such a fluorosulfonic acid skeleton can suppress the decrease in the movement speed of Li ions in the negative electrode SEI film, it is possible to suitably exhibit the effect by using the negative electrode active material having a large specific surface area, and to sufficiently reduce the reaction resistance of the negative electrode.

In the nonaqueous electrolyte secondary cell disclosed herein which is based on the above findings, a negative electrode SEI film satisfying the above formula (1) and a positive electrode SEI film satisfying the formula (2) are formed, the BET specific surface area of the negative electrode active material is 3.5 m$^2$/g or more and 5.0 m$^2$/g or less, and the component amount $I_B$ of the LiBOB skeleton is 4.3 μmol/m$^2$ or more. As a result, various types of cell performance can be exhibited at a high level and the cell can be more suitably used for a high-output power source for vehicles and the like.

The "component amount ($I_B$) of the LiBOB skeleton" in the present specification, is a value obtained by measuring the component amount of boron (B) in the negative electrode by inductively coupled plasma (ICP) emission spectroscopic analysis and is a value (μmol/m$^2$) normalized with respect to the BET specific surface area (m$^2$/g) of the negative electrode active material. The "component amount ($I_S$) of the fluorosulfonic acid skeleton" is a value obtained by measuring the component amount of FSO$_3^-$ in the negative electrode by ion chromatography (IC) and is a value (μmol/m$^2$) normalized with respect to the BET specific surface area (m$^2$/g) of the negative electrode active material.

Meanwhile, the "component amount ($I_P$) of phosphoric acid skeleton" is obtained by measuring the total amount of PO$_3$F$^-$, PO$_2$F$_2^-$, PO$_4^{3-}$ in the positive electrode by ion chromatography (IC).

Further, "the BET specific surface area" is a value obtained by analyzing, by the BET method, the gas adsorption amount measured by a gas adsorption method (constant volume adsorption method) using nitrogen ($N_2$) gas as an adsorbate.

Further, in a preferred embodiment of the nonaqueous electrolyte secondary cell disclosed herein, the component amount $I_B$ of the LiBOB skeleton is 7.6 µmol/m$^2$ or less.

As described above, in the cell disclosed herein, by setting the component amount $I_B$ of the LiBOB skeleton to 4.3 µmol/m$^2$ or more, it is possible to suppress suitably the deterioration of cell capacity despite the fact that the negative electrode active material having a large specific surface area is used. However, where the component amount $I_B$ of the LiBOB skeleton is too large, not only the effect of suppressing the deterioration of capacity is saturated, but also the movement speed of Li ions in the negative electrode SEI film may be greatly reduced. Therefore, the component amount $I_B$ of the LiBOB skeleton is preferably 7.6 µmol/m$^2$ or less.

DETAILED DESCRIPTION OF THE PREFERRED EMBODIMENTS

Hereinafter, a nonaqueous electrolyte secondary cell according to one embodiment of the present invention will be described. In the drawings used for the following description, the same reference numerals are attached to the members/parts that exhibit the same action. The dimensional relationship (length, width, thickness, and the like) in each drawing does not reflect the actual dimensional relationship. In addition, matters other than matters particularly referred to in the present specification and necessary for the implementation of the present invention (for example, the structure of the cell case, the electrode terminal, and the like) can be grasped by a person skilled in the art as design matters based on the related art in the pertinent field.

1. Lithium Ion Secondary Cell

Figure 1:
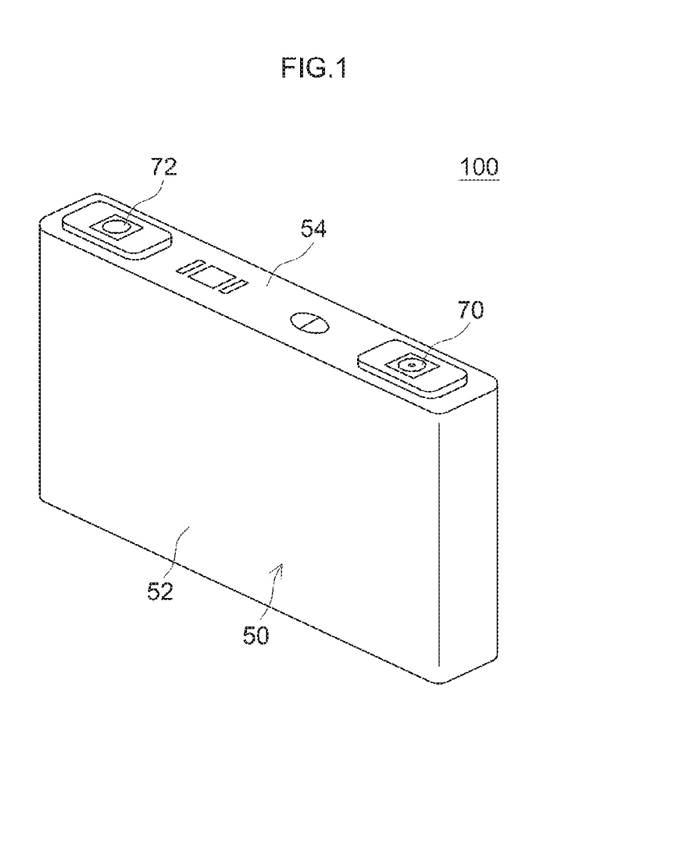
FIG. 1 is a perspective view schematically illustrating a lithium ion secondary cell according to one embodiment of the present invention.
Figure 2:
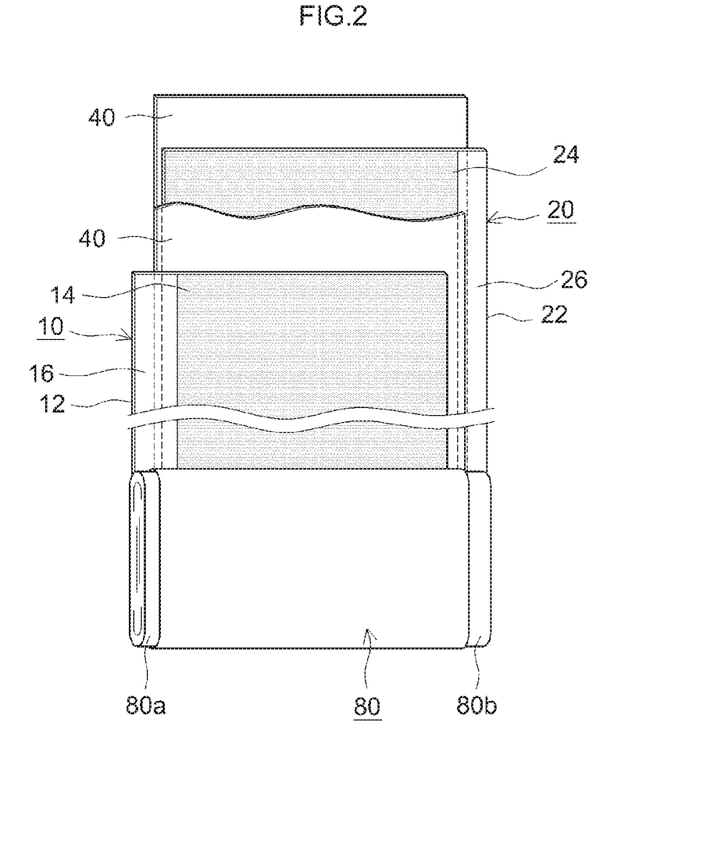
FIG. 2 is a perspective view schematically illustrating an electrode body of a lithium ion secondary cell according to one embodiment of the present invention.
Figure 3:
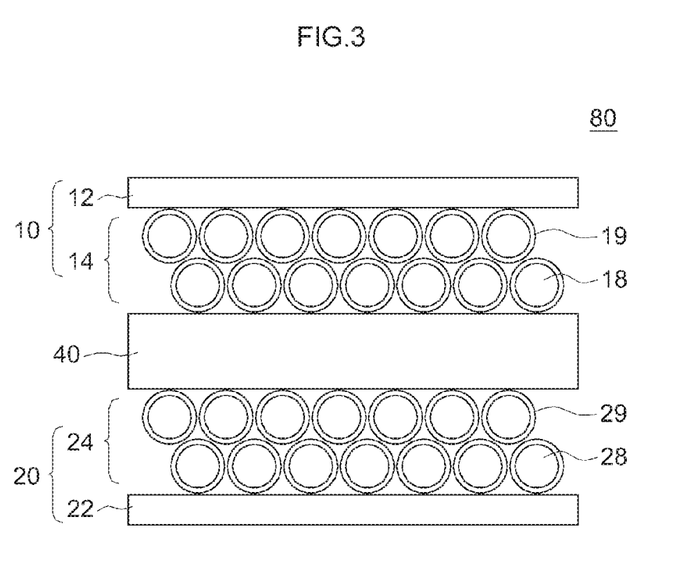
FIG. 3 is a schematic view for explaining the structure of positive and negative electrodes of a lithium ion secondary cell according to one embodiment of the present invention.

Hereinafter, a lithium ion secondary cell will be described as an example of the nonaqueous electrolyte secondary cell disclosed herein. FIG. 1 is a perspective view schematically illustrating a lithium ion secondary cell according to this embodiment, FIG. 2 is a perspective view schematically illustrating an electrode body of the lithium ion secondary cell according to this embodiment. FIG. 3 is a schematic view for explaining the structure of positive and negative electrodes of the lithium ion secondary cell according to this embodiment of the present invention.

(1) Cell Case

As depicted in FIG. 1, a lithium ion secondary cell 100 according to the present embodiment includes a flat prismatic cell case 50. This cell case 50 is composed of a flat case main body 52 having an open upper surface and a lid member 54 which closes the opening of the upper surface. A positive electrode terminal 70 and a negative electrode terminal 72 are provided on the lid member 54 forming the upper surface of the cell case 50.

(2) Electrode Body

In the lithium ion secondary cell 100 according to the present embodiment, an electrode body 80 depicted in FIG. 2 is housed inside the cell case 50 depicted in FIG. 1. As depicted in FIGS. 2 and 3, the electrode body 80 includes a positive electrode 10, a negative electrode 20, and a separator 40, and the positive electrode 10 and the negative electrode 20 are opposed to each other with the separator 40 interposed therebetween.

The electrode body 80 depicted in FIG. 2 is a wound electrode body formed by laminating the positive electrode 10 and the negative electrode 20 with the separator 40 interposed therebetween and winding the laminate. However, in the nonaqueous electrolyte secondary cell disclosed herein, any electrode body having a positive electrode and a negative electrode may be used, and the wound electrode body as depicted in FIG. 2 is not limiting. As another example of the electrode body, a laminated electrode body in which a plurality of positive electrodes, negative electrodes, and separators are laminated can be mentioned.

(a) Positive Electrode

Each member constituting the electrode body 80 will be specifically described below.

As depicted in FIG. 2, the positive electrode 10 is formed by applying a positive-electrode mixture layer 14 to the surface (for example, both surfaces) of a positive electrode current collector 12. Further, on one side edge portion of the positive electrode 10, a current collector exposed portion 16 to which the positive-electrode mixture layer 14 is not applied is formed. A positive electrode connecting portion 80a around which the current collector exposed portion 16 is wound is formed on one side edge portion of the electrode body 80. A positive electrode terminal 70 (see FIG. 1) is connected to the positive electrode connecting portion 80a. For the positive electrode current collector 12, an aluminum foil or the like is used.

As schematically depicted in FIG. 3, the positive-electrode mixture layer 14 includes a particulate positive electrode active material 18. The positive electrode active material 18 is constituted by a lithium complex oxide capable of occluding and releasing lithium ions. As the positive electrode active material 18 in the present embodiment, a lithium complex oxide (lithium transition metal complex oxide) including one or more transition metal elements is used. Examples of such a lithium transition metal complex oxide include lithium nickel complex oxide, lithium nickel cobalt complex oxide, lithium nickel cobalt manganese complex oxide, and the like.

Although not shown in the figure, the positive-electrode mixture layer 14 may include additives other than the positive electrode active material 18. Examples of such additives include a conductive material and a binder. As the conductive material, for example, a carbon material such as carbon black, for example, acetylene black (AB), graphite, or the like can be suitably used. As the binder, for example, polyvinylidene fluoride (PVdF), polyvinylidene chloride (PVdC), polyethylene oxide (PEO), or the like can be used.

Further, as depicted in FIG. 3, in the lithium ion secondary cell 100 according to the present embodiment, a positive electrode SEI film 19 is formed on the surface of the positive electrode active material 18. As will be described in detail later, the positive electrode SEI film 19 is a film derived from an oxofluorophosphate (such as $LiPO_2F_2$) added to a nonaqueous electrolytic solution, and phosphoric acid skeleton components ($PO_3F^-$, $PO_2F_2^-$, $PO_4^{3-}$) are present therein. By covering the surface of the positive electrode active material 18 with the positive electrode SEI film 19 including such phosphoric acid skeleton components, elution of transition metal elements (Ni, Co, Mn, and the like) from the positive electrode active material 18 can be suppressed. As a result, it is possible to prevent suitably the increase in reaction resistance due to precipitation of the transition metal elements on the surface of the negative electrode active material 28.

(b) Negative Electrode

As depicted in FIG. 2, the negative electrode 20 is formed by applying a negative-electrode mixture layer 24 to the surface (for example, both surfaces) of a negative electrode current collector 22. Further, on one side edge portion of the negative electrode 20, a current collector exposed portion 26 to which the negative-electrode mixture layer 24 is not applied is formed. A negative electrode connecting portion 80b around which the current collector exposed portion 26 is wound is formed on one side edge portion of the electrode body 80. A negative electrode terminal 72 (see FIG. 1) is connected to the negative electrode connecting portion 80b. For the negative electrode current collector 22, a copper foil or the like is used.

As depicted in FIG. 3, the negative-electrode mixture layer 24 includes a particulate negative electrode active material 28. The negative electrode active material 28 is constituted by a carbon material. For example, graphite, hard carbon, soft carbon, amorphous carbon or the like can be used. Further, the negative electrode active material 28 is not necessarily composed of a single carbon material, and may be composed of a composite material in which a plurality of carbon materials is compounded. For example, a composite material (amorphous coated spherical natural graphite) in which the surface of particulate natural graphite is coated with amorphous carbon can be used for the negative electrode active material 28.

In addition, the negative-electrode mixture layer 24 may include additives other than the negative electrode active material 28. Examples of such additives include a binder and a thickener. As the binder, for example, polyvinylidene fluoride (PVdF), styrene butadiene rubber (SBR) and the like can be used. As the thickener, for example, carboxymethyl cellulose (CMC) or the like can be used.

As schematically shown in FIG. 3, in the present embodiment, a negative electrode SEI film 29 is formed on the surface of the negative electrode active material 28. As will be described in detail later, the negative electrode SEI film 29 is a film derived from LiBOB and a fluorosulfonate ($FSO_3Li$ and the like) in the nonaqueous electrolytic solution, and a LiBOB skeleton component (boron (B)) and fluorosulfonic acid skeleton component ($FSO_3^-$) are present in the negative electrode SEI film 29. In this way, as a result of forming the negative electrode SEI film 29 derived from LiBOB, decomposition of the nonaqueous electrolytic solution during charge and discharge can be suppressed. Further, since the fluorosulfonic acid skeleton component is present in the negative electrode SEI film 29 in the present embodiment, the decrease in the movement speed of Li ions can be suitably prevented despite the inclusion of the LiBOB skeleton component.

Further, in the lithium ion secondary cell 100 according to the present embodiment, a carbon material having a BET specific surface area of 3.5 $m^2/g$ or more and 5.0 $m^2/g$ or less is used as the negative electrode active material 28. Where the BET specific surface area of the negative electrode active material 28 is increased, the reaction resistance at the negative electrode 20 can be lowered, but deterioration of cell capacity due to decomposition of the electrolytic solution is likely to occur. As will be described in detail hereinbelow, in consideration for the trade-off relationship with the BET specific surface area, in the present embodiment, the component amount $I_B$ of the LiBOB skeleton component in the negative electrode SEI film 29 is set to 4.3 $\mu mol/m^2$ or more. This makes it possible to suitably suppress the decomposition of the electrolytic solution resulting from using the negative electrode active material 28 having a large BET specific surface area, so that excellent results can be obtained for both the reaction resistance of the negative electrode 20 and the cell capacity.

(c) Separator

The separator 40 is disposed between the positive electrode 10 and the negative electrode 20. The separator 40 is a porous insulating sheet formed with a plurality of fine holes (pore diameter: about 0.01 μm to 6 μm) through which charge carriers (lithium ions) pass. As the separator 40, for example, an insulating resin such as polyethylene (PE), polypropylene (PP), a polyester, a polyamide, or the like can be used. The separator 40 may be a laminated sheet obtained by laminating two or more of the abovementioned resins. The thickness of the separator 40 is, for example, 5 μm to 40 μm, typically 10 μm to 30 μm, and preferably 15 μm to 25 μm. Further, a heat resistant layer (HRL layer) including a metal oxide such as alumina ($Al_2O_3$) may be formed on the surface of the separator 40.

(3) Nonaqueous Electrolyte

Although not depicted in the figure, in the lithium ion secondary cell 100 according to the present embodiment, a nonaqueous electrolytic solution including a supporting salt in an organic solvent (nonaqueous solvent) is accommodated in the cell case 50 (see FIG. 1). In the present embodiment, additives (film forming agents) which are to be precursors of the positive electrode SEI film 19 and negative electrode SEI film 29 are added to the nonaqueous electrolytic solution. The composition of the nonaqueous electrolytic solution in the present embodiment will be described hereinbelow.

(A) Nonaqueous Solvent

As the nonaqueous solvent, for example, various organic solvents (for example, saturated cyclic carbonates, linear carbonates, linear carboxylic acid esters, cyclic carboxylic acid esters, ether-based compounds, sulfone-based compounds, and the like), which are used in electrolytic solutions for general lithium ion secondary cells, can be used without particular limitation. These organic solvents may be used singly or in combination of two or more thereof.

Among such nonaqueous solvents, specific examples of saturated cyclic carbonate include ethylene carbonate, propylene carbonate, butylene carbonate and the like. Specific examples of linear carbonates include dimethyl carbonate, diethyl carbonate, ethyl methyl carbonate, di-n-propyl carbonate, and the like. Examples of linear carboxylic acid esters include methyl acetate, ethyl acetate, n-propyl acetate, n-butyl acetate and the like. Examples of cyclic carboxylic acid esters include gamma butyrolactone, gamma valerolactone, gamma caprolactone, epsilon caprolactone and the like. Examples of ether compounds include diethyl ether, di(2-fluoroethyl) ether, di(2,2-difluoroethyl) ether and the like. Examples of the sulfone compound include 2-methylsulfolane, 3-methylsulfolane, 2-fluorosulfolane, 3-fluorosulfolane and the like.

(B) Supporting Salt

The supporting salt is used as a main electrolyte. For example, lithium salts such as $LiPF_6$, $LiBF_4$, $LiClO_4$ and the like can be suitably used for this supporting salt. The amount of such a supporting salt is not particularly limited so long as it does not significantly impair the effect of the present invention. Specifically, when $LiPF_6$ is used as the supporting salt, the lower limit of the molar amount of $LiPF_6$ is preferably 0.5 mol/L or more, more preferably 0.6 mol/L or more, and even more preferably 0.7 mol/L or more. Further, the upper limit value is preferably 3.0 mol/L or less, more preferably 2.0 mol/L or less, and particularly preferably 1.5 mol/L or less. The range of the amount of $LiPF_6$ is preferably 0.5 mol/L or more and 3.0 mol/L or less, more preferably 0.5 mol/L or more and 2.0 mol/L or less, and even more preferably 0.5 mol/L or more and 1.5 mol/L or less.

When the amount of $LiPF_6$ is within the above range, the total amount of ions in the nonaqueous electrolytic solution and the viscosity of the electrolytic solution can be appropriately balanced. As a result, the input/output characteristic can be more suitably improved without excessively lowering the ionic conductivity.

(C) Film Forming Agent

Further, as described above, film forming agents to be precursors for the positive electrode SEI film 19 and the negative electrode SEI film 29 are added to the nonaqueous electrolytic solution of the lithium ion secondary cell 100 according to the present embodiment. Specifically, LiBOB, a fluorosulfonate, and an oxofluorophosphate are included as film forming agents in the nonaqueous electrolytic solution according to the present embodiment. It is to be noted that the film forming agents described hereinbelow may be entirely used for forming the positive electrode SEI film 19 and the negative electrode SEI film 29, or a part thereof may remain in the nonaqueous electrolytic solution.

(c-1) LiBOB

The nonaqueous electrolytic solution in the present embodiment includes lithium bis(oxalato)borate (LiBOB). As a result of including LiBOB in the nonaqueous electrolytic solution, the negative electrode SEI film 29 having a LiBOB skeleton can be formed on the surface of the negative electrode active material 28.

Although described in detail hereinbelow, in the present embodiment, the ratio ($I_B/I_S$) of the component amount of the LiBOB skeleton component to the component amount of the fluorosulfonic acid skeleton component in the negative electrode SEI film 29 is adjusted to a predetermined value. Here, the amount of LiBOB in the nonaqueous electrolytic solution is preferably adjusted so as to satisfy the ratio of the above component amounts. Specifically, the lower limit of the amount of LiBOB is preferably 0.01% by mass or more, more preferably 0.05% by mass or more, and even more preferably 0.1% by mass or more, with the total amount of the nonaqueous electrolytic solution being 100% by mass. Further, the upper limit is preferably 3% by mass or less, more preferably 2% by mass or less, still more preferably 1.7% by mass or less, with the total amount of the nonaqueous electrolytic solution being 100% by mass.

(c-2) Fluorosulfonate

The nonaqueous electrolytic solution in the present embodiment includes a fluorosulfonate. By including a fluorosulfonate in the nonaqueous electrolytic solution, it is possible to form the negative electrode SEI film 29 including the fluorosulfonic acid skeleton.

Examples of such a fluorosulfonate include $FSO_3Li$, $FSO_3Na$, $FSO_3K$, $FSO_3(CH_3)_4N$, $FSO_3(C_2H_5)_4N$, $FSO_3(n-C_4H_9)_4N$, and the like.

The amount of fluorosulfonate is also adjusted so that the ratio ($I_B/I_S$) of the component amount of the LiBOB skeleton component to the component amount of the fluorosulfonic acid skeleton component in the negative electrode SEI film 29 becomes a predetermined value. Specifically, the lower limit of the amount of the fluorosulfonate is preferably 0.01% by mass or more, more preferably 0.05% by mass or more, and even more preferably 0.1% by mass or more, with the total amount of the nonaqueous electrolytic solution being 100% by mass. Further, the upper limit value is preferably 3% by mass or less, more preferably 2.5% by mass or less, and even more preferably 2% by mass or less, with the total amount of the nonaqueous electrolytic solution being 100% by mass.

(C-3) Oxofluorophosphate

The nonaqueous electrolytic solution in the present embodiment includes an oxofluorophosphate. As a result, the positive electrode SEI film 19 having a phosphoric acid skeleton can be formed on the surface of the positive electrode active material 18.

Examples of such oxofluorophosphates include $Li_2PO_3F$, $LiPO_2F_2$, $NaPO_2F_2$, $KPO_2F_2$, and the like. The amount of the oxofluorophosphate is adjusted so that a suitable positive electrode SEI film 19 is formed. Specifically, the lower limit of the amount of the oxofluorophosphate is preferably 0.01% by mass or more, more preferably 0.05% by mass or more, and even more preferably 0.1% by mass or more, with the total amount of the nonaqueous electrolytic solution being 100% by mass. Further, the upper limit value is preferably 3% by mass or less, more preferably 2.5% by mass or less, and even more preferably 2% by mass or less, with the total amount of the nonaqueous electrolytic solution being 100% by mass.

2. SEI Film

As described above, in the lithium ion secondary cell 100 according to the present embodiment, the positive electrode SEI film 19 is formed on the surface of the positive electrode active material 18, and the negative electrode SEI film 29 is formed on the surface of the negative electrode active material 28. These SEI films are formed by using the nonaqueous electrolytic solution to which the abovementioned film forming agents have been added and performing initial charging and aging treatment under predetermined conditions, so that the following formula (1) and (2) are satisfied.

$$4 \leq I_B/I_S \leq 10 \quad (1)$$

$$5 \text{ μmol/m}^2 \leq I_P \leq 15 \text{ μmol/m}^2 \quad (2)$$

(a) Negative Electrode SEI Film

As described above, the LiBOB skeleton component and the fluorosulfonic acid skeleton component are present in the negative electrode SEI film 29 in the present embodiment.

Where the LiBOB skeleton component in the negative electrode SEI film 29 increases, the decrease in cell capacity due to decomposition of the electrolytic solution can be suppressed, whereas the movement speed of Li ions in the negative electrode SEI film 29 may decrease and the cell resistance may rise. Meanwhile, where the fluorosulfonic acid skeleton component having a suitable component amount is present in the negative electrode SEI film 29, the movement speed of Li ions in the negative electrode SEI film 29 is improved, and the increase in cell resistance caused by the decrease in the movement speed of Li ions can be suppressed. The above formula (1) is set based on this viewpoint, and the ratio ($I_B/I_S$) of the component amount $I_B$ of the LiBOB skeleton component to the component amount $I_S$ of the fluorosulfonic acid skeleton component is established as 4 or more and 10 or less. As a result, it is possible to suppress the increase in cell resistance caused by the decrease in the movement speed of Li ions, and also to suitably prevent the decrease in cell capacity due to decomposition of the electrolytic solution. From the viewpoint of more effectively exhibiting the effect of the present invention, the value of $I_B/I_S$ is preferably set to 5 or more and 8 or less, and more preferably to 6 or more and 7 or less.

Further, in the present embodiment, as described above, the negative electrode active material 28 having a BET specific surface area of 3.5 m$^2$/g or more and 5.0 m$^2$/g or less is used. The negative electrode active material 28 has a larger specific surface area than a general negative electrode active material. Therefore, while it is possible to suitably lower the reaction resistance at the negative electrode 20, deterioration of the cell capacity due to decomposition of the electrolytic solution is likely to occur. However, in the present embodiment, the negative electrode SEI film 29 having the component amount $I_B$ of the LiBOB skeleton component of 4.3 µmol/m$^2$ or more is formed. As a result of forming the negative electrode SEI film 29 including such a sufficient amount of the component LiBOB skeleton component, it is possible to lower sufficiently the reaction resistance at the negative electrode 20, without causing the deterioration of cell capacity.

In addition, in the lithium ion secondary cell 100 according to the present embodiment, as described above, since the fluorosulfonic acid skeleton is present in the negative electrode SEI film 29, it is possible to suitably suppress the decrease in the movement speed of Li ions caused by the LiBOB skeleton. Therefore, the effect of lowering the reaction resistance by using the negative electrode active material 28 having a large specific surface area can be particularly suitably exhibited.

The component amount $I_B$ of the LiBOB skeleton component may be 4.3 µmol/m$^2$ or more, but where this component amount exceeds 7.6 µmol/m$^2$, not only the effect of suppressing the capacity deterioration is saturated, but also the movement speed of Li ions in the negative electrode SEI film 29 can be greatly reduced. Therefore, the component amount $I_B$ of the LiBOB skeleton component is preferably 4.3 µmol/m$^2$ or more and 7.6 µmol/m$^2$ or less.

(b) Positive Electrode SEI Film

As described above, in the lithium ion secondary cell 100 according to the present embodiment, the positive electrode SEI film 19 having a phosphoric acid skeleton is formed on the surface of the positive electrode active material 18. This makes it possible to prevent the transition metal element from eluting from the positive electrode active material 18 and appropriately prevent the reaction resistance of the negative electrode 20 from rising due to precipitation of the transition metal element on the surface of the negative electrode active material 28.

However, where the positive electrode SEI film 19 having the phosphoric acid skeleton is excessively formed on the surface of the positive electrode active material 18, the movement speed of Li ions in the positive electrode 10 decreases, and the cell resistance may increase.

The above formula (2) is set based on this viewpoint, and by adjusting the component amount $I_P$ of the phosphoric acid skeleton of the positive electrode SEI film 19 to 5 µmol/m$^2$ or more and 15 µmol/m$^2$ or less, the increase in reaction resistance due to elution of the transition metal element can be suitably suppressed without causing the increase in cell resistance due to a decrease in the movement speed of Li ions.

From the viewpoint of more advantageously bringing out the effects of the present invention, the component amount $I_P$ of the phosphoric acid skeleton is preferably set to 6 µmol/m$^2$ or more and 10 µmol/m$^2$ or less, and more preferably 7 µmol/m$^2$ or more and 9 µmol/m$^2$ or less (for example, 8 µmol/m$^2$).

As described above, with the lithium ion secondary cell 100 of the present embodiment, by forming the negative electrode SEI film 29 in which $I_B/I_S$ is adjusted so as to satisfy the above formula (1), the decrease in cell capacity due to decomposition of the electrolytic solution can be prevented without lowering the movement speed of Li ions.

Further, by forming the positive electrode SEI film 19 in which the $I_P$ is adjusted so as to satisfy the above formula (2), the increase in reaction resistance due to elution of the transition metal element can be suitably suppressed without lowering the movement speed of Li ions.

Furthermore, since the component amount $I_B$ of the LiBOB skeleton component is set to be suitable for the BET specific surface area of the negative electrode active material 28, the reaction resistance of the negative electrode 20 can be sufficiently lowered, and the capacity deterioration can be suitably prevented.

As described above, the lithium ion secondary cell 100 according to the present embodiment is improved in various cell performances as compared with the conventional non-aqueous electrolyte secondary cells, and therefore can be suitably used for a high-output power supply for vehicles.

Test Examples

Hereinafter, test examples relating to the present invention will be described, but the description of the test examples is not intended to limit the present invention.

A. First Test

In the first test, 20 lithium ion secondary cells (Test Examples 1 to 20) having different values of the ratio ($I_B/I_S$) of the component amount $I_B$ of the LiBOB skeleton component to the component amount $I_S$ of the fluorosulfonic acid skeleton component and the component amount $I_P$ of the phosphoric acid skeleton component were prepared.

1. Test Examples

The lithium ion secondary cell fabricated in the first test will be specifically described hereinbelow.

Here, first, a positive electrode active material ($Li_{1+x}Ni_{1/3}Co_{1/3}Mn_{1/3}O_2$), a conductive material (acetylene black: AB) and a binder (polyvinylidene fluoride: PVdF) were mixed at ratios of 90:8:2, and the mixture was dispersed in a dispersion medium (N-methylpyrrolidone: NMP) to prepare a positive electrode mixture paste.

Then, the positive electrode mixture paste was applied to both surfaces of a positive electrode current collector (aluminum foil), and then dried and rolled to prepare a sheet-shaped positive electrode.

Next, in the present test example, particulate natural graphite (amorphous coated spherical natural graphite) surface-coated with amorphous carbon was used as a negative electrode active material. Then, the negative electrode active material, a thickener (carboxymethyl cellulose: CMC) and a binder (styrene butadiene rubber: SBR) were mixed at ratios of 98:1:1, and the mixture was dispersed in a dispersion medium (water) to prepare a negative electrode mixture paste.

Then, the negative electrode mixture paste was applied to both surfaces of a negative electrode current collector (copper foil), and then dried and rolled to prepare a sheet-shaped negative electrode.

Next, the positive electrode and the negative electrode prepared as described above were laminated with a sheet-shaped separator interposed therebetween, and then the laminate was wound and pressed to produce a flat wound electrode body. Then, the produced wound electrode body was connected to electrode terminals (positive electrode terminal and negative electrode terminal) and then housed inside a cell case. The separator used in this test example had a three-layer structure (PP/PEPP) separator in which a polyethylene (PE) layer was sandwiched between two polypropylene (PP) layers.

Next, the inside of the cell case was impregnated with a nonaqueous electrolytic solution obtained by including a supporting salt ($LiPF_6$) at a concentration of about 1 mol/L in a mixed solvent including ethylene carbonate (EC), dimethyl carbonate (DMC) and ethyl methyl carbonate (EMC) in volume ratios of 3:3:4.

Here, LiBOB, fluorosulfonate ($FSO_3Li$) and lithium difluorophosphate ($LiPO_2F_2$) were added as film forming agents to the nonaqueous electrolytic solution in the present test example. The addition amounts of the three kinds of film forming agents were different in each of Test Examples 1 to 20.

Next, the case main body and the lid member were welded to each other to prepare a test lithium ion secondary cell. Then, after initial charging (4.1 V, 1 C), aging treatment (60° C., 20 hr) was performed to prepare a lithium ion secondary cell in which a predetermined SEI film was formed.

2. Evaluation Tests (1) Component Analysis of SEI Film

For the cells of Test Examples 1 to 20 described above, discharging was performed until the potential between the terminals of the positive electrode and the negative electrode reached 3 V (state with SOC 0%). Then, the cell case was disassembled and the positive electrode and the negative electrode were taken out. Then, the extracted positive electrode and negative electrode were washed with ethyl methyl carbonate (EMC) and then cut into a size of 17 mm×17 mm to prepare a sample for analysis.

Ion chromatography (IC) was performed on the sample for analysis of the negative electrode, the amount of $FSO_3^-$ present in the negative electrode was measured. Then, the component amount of $FSO_3^-$ ($\mu mol/m^2$) related to the BET specific surface area of the negative electrode active material was defined as the "component amount $I_S$ of fluorosulfonic acid skeleton". In addition, an emission spectroscopic analysis method using inductively coupled plasma (ICP) was performed on the sample for analysis of the negative electrode, the component amount of boron (B) present in the negative electrode was measured, and the component amount ($\mu mol/m^2$) of boron (B) related to the BET specific surface area of the negative electrode active material was defined as the "component amount $I_B$ of the LiBOB skeleton". Then, $I_B/I_S$ was calculated based on these measurement results. The measurement results are shown in Table 1.

Meanwhile, ion chromatography (IC) was performed on the sample for analysis of the positive electrode, and the component amount of each of $PO_3F^-$, $PO_2F_2^-$, and $PO_4^{3-}$ present in the positive electrode was measured. Then, the sum total of these component amounts was defined as the "component amount $I_P$ of the phosphoric acid skeleton". The measurement results of the component amount $I_P$ of the phosphoric acid skeleton are shown in Table 1.

(2) Low-Temperature Resistance After Durability Test

Here, in order to evaluate the cell performance of the lithium ion secondary cells of Test Examples 1 to 20, the low-temperature resistance (mΩ) after a high-temperature durability test was measured. Specifically, first, a high-temperature durability test in which the lithium ion secondary cell of each test example was stored for 100 days at 60° C. was performed. Then, the SOC of each cell after the durability test was adjusted to 50%, charging IV resistance was measured for 10 sec under an environment of –30° C. and the measurement result was taken as the "low-temperature resistance after durability test".

Figure 4:
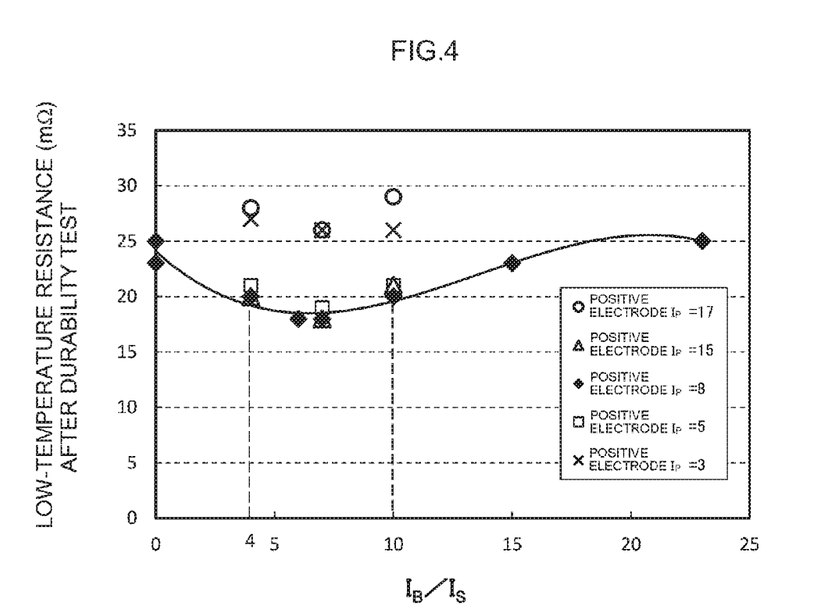
FIG. 4 is a graph illustrating measurement results of low-temperature resistance after a durability test in the lithium ion secondary cells of Test Examples 1 to 20.

The measurement result of the low-temperature resistance after the above durability test is shown in Table 1 and FIG. 4. In FIG. 4, the low-temperature resistance (m≤) after the durability test is plotted against the ordinate, and $I_B/I_S$ of the negative electrode SEI film is plotted against the abscissa Among the plots in FIG. 4, "x" represents a test example in which the $I_P$ of the positive electrode SEI film was 3 $\mu mol/m^2$, and "□" represents a test example in which it was 5 $\mu mol/m^2$. In addition, "♦" represents a test example in which the $I_P$ of the positive electrode SEI film was 8 $\mu mol/m^2$, and "Δ" represents a test example in which it was 15 $\mu mol/m^2$. Further, the plot "○" shows a test example in which the $I_P$ of the positive electrode SEI film was 17 $\mu mol/m^2$.

TABLE 1

| Test Example | $I_B/I_S$ of negative electrode SEI film | $I_P$ of positive electrode SEI film ($\mu mol/m^2$) | Low-temperature resistance after durability test (mΩ) |
|---|---|---|---|
| 1 | 7 | 8 | 18 |
| 2 | 10 | 8 | 20 |
| 3 | 4 | 8 | 20 |
| 4 | 6 | 8 | 18 |
| 5 | 15 | 8 | 23 |
| 6 | 23 | 8 | 25 |
| 7 | 0 | 8 | 23 |
| 8 | 0 | 8 | 25 |
| 9 | 4 | 5 | 21 |
| 10 | 7 | 5 | 19 |
| 11 | 10 | 5 | 21 |
| 12 | 4 | 15 | 20 |
| 13 | 7 | 15 | 18 |
| 14 | 10 | 15 | 21 |
| 15 | 4 | 17 | 28 |
| 16 | 7 | 17 | 26 |
| 17 | 10 | 17 | 29 |
| 18 | 4 | 3 | 27 |
| 19 | 7 | 3 | 76 |
| 20 | 10 | 3 | 26 |

As shown in Table 1 and FIG. 4, when comparing Test Examples 1 to 8, in Test Examples 5 and 6 in which $I_B/I_S$ of the negative electrode SEI film exceeded 10, the low-temperature resistance after the durability test greatly increased and significant decrease in cell performance was observed. This is considered to be due to the fact that the component amount of the LiBOB skeleton component was too large and the movement speed of Li ion in the negative electrode SEI film was lowered.

Also in Test Examples 7 and 8 in which $I_B/I_S$ of the negative electrode SEI film was less than 4, the low-temperature resistance after the durability test has greatly increased, and a significant decrease in cell performance was observed. This is considered to be due to the fact that the component amount of the LiBOB skeleton component was too small and the capacity deterioration due to decomposition of the electrolytic solution occurred.

Meanwhile, in Test Examples 1 to 4 in which $I_B/I_S$ of the negative electrode SEI film was set within the range of 4 to 10, the increase in low-temperature resistance after durability was suppressed. From this, it was understood that when an SEI film is formed on the surface of the negative electrode active material, it is necessary to form the negative electrode SEI film in which a LiBOB skeleton and a fluorosulfonic acid skeleton are present and to set the ratio ($I_B/I_S$) of the component amounts thereof to be 4 or more and 10 or less, and in this case, suitable cell performance can be maintained.

Meanwhile, when comparing Test Examples 9 to 20, in the case where the $I_P$ of the positive electrode SEI film exceeded 15 even though $I_B/I_S$ was set to 4 or more and 10 or less (Test Examples 15 to 17), the low-temperature resistance after the durability test was greatly increased, and the cell performance remarkably decreased. This is considered to be due to the fact that the positive electrode SEI film was formed in excess and the movement speed of Li ions in the positive electrode was lowered.

Also, in Test Examples 18 to 20 in which the $I_P$ of the positive electrode SEI film is less than 5, a significant deterioration of cell performance was observed. This is considered to be due to the fact that the formation of the positive electrode SEI film was insufficient and elution of the transition metal element from the positive electrode active material could not be prevented.

In Test Examples 9 to 14 in which the $I_P$ of the positive electrode SEI film was set within the range of 5 μmol/m$^2$ to 15 μmol/m$^2$, a significant decrease in cell performance was suitably suppressed. From this, it was understood that when an SEI film is formed on the surface of the positive electrode active material, it is necessary that the phosphoric acid skeleton be present in the positive electrode SEI film and that the component amount $I_P$ of the phosphoric acid skeleton be adjusted to the range of 5 μmol/m$^2$ to 15 μmol/m$^2$, and in this case, suitable cell performance can be maintained.

B. Second Test

Next, in the second test, the relationship between the specific surface area of the negative electrode active material and the component amount $I_B$ of the LiBOB skeleton component was examined in the lithium ion secondary cell satisfying the formulas (1) and (2).

1. Test Examples

In the second test, 15 lithium ion secondary cells in which $I_B/I_S$ of the negative electrode SEI film was 7 and the component amount $I_P$ of the phosphoric acid skeleton of the positive electrode SEI film was 8 μmol/m$^2$ were prepared (Test Examples 21 to 36). The BET specific surface area of the negative electrode active material and the component amount ($I_B$) of the LiBOB skeleton component of the negative electrode SEI film were made different, as shown in Table 2, for the cells of each test example.

2. Evaluation Test (1) Capacity Deterioration Rate

For the cells of Test Examples 21 to 36 described above, the rate at which the cell capacity deteriorated (capacity deterioration rate) was evaluated.

Here, firstly, the initial capacity was measured after the initial charge and discharge of the cells of each test example. Specifically, constant-current and constant-voltage discharge (CCCV discharge) in which the cell of each test example was discharged to 3.0 V at 1 C was carried out after performing constant-current and constant-voltage charge (CCCV charge) in which the cell was charged to 4.1 V at 1 C. Then, the discharge capacity after the initial charge and discharge was measured as "initial capacity".

Next, after conducting a deterioration test of storing the cell charged up to 4.1 V in a temperature environment of 60° C. for 100 days, the discharge capacity was measured under the same conditions as the above-mentioned "initial capacity" and the measurement result was taken as "capacity after the deterioration test".

Then, based on the measurement results of "initial capacity" and "capacity after the deterioration test", the value obtained by calculating the reduction rate of cell capacity in the square root of the period during which the deterioration test was performed was taken as "capacity deterioration rate (% (DAY$^{-1/2}$))". The results are shown in Table 2 and FIG. 5.

(2) Low-Temperature Reaction Resistance

Similarly to the first test described above, the SOC of each cell of each test example was adjusted to 50%, and the charge IV resistance was measured as "low-temperature resistance" at −30° C. for 10 sec. Then, the low temperature resistance (mΩ) per area (m$^2$) of the negative electrode mixture layer was calculated as "low-temperature reaction resistance (mΩ/m$^2$)". The measurement results are shown in Table 2 and FIG. 6.

TABLE 2

| Test Example | BET specific surface area of negative electrode active material (m$^2$/g) | $I_B$ of negative electrode SEI film (μmol/m$^2$) | Capacity deterioration rate (% (day$^{-1/2}$)) | Low-temperature reaction resistance (mΩ/m$^2$) |
|---|---|---|---|---|
| 21 | 3.9 | 7.6 | 0.013 | 1.11 |
| 22 | 3.9 | 7.6 | 0.012 | 1.21 |
| 23 | 4.2 | 7.0 | 0.013 | 1.20 |
| 24 | 4.7 | 6.3 | 0.016 | 0.87 |
| 25 | 4.2 | 5.5 | 0.016 | 0.97 |
| 26 | 3.9 | 5.1 | 0.015 | 1.06 |
| 27 | 4.7 | 4.9 | 0.018 | 0.73 |
| 28 | 3.5 | 4.7 | 0.018 | 0.95 |
| 29 | 4.2 | 4.3 | 0.020 | 0.81 |
| 30 | 5.0 | 4.3 | 0.020 | 0.63 |
| 31 | 4.7 | 3.9 | 0.024 | 0.64 |
| 32 | 5.2 | 4.0 | 0.024 | 0.59 |
| 33 | 5.8 | 3.8 | 0.029 | 0.53 |
| 34 | 3.4 | 7.6 | 0.011 | 1.40 |
| 35 | 3.3 | 7.6 | 0.011 | 1.50 |
| 36 | 3.2 | 7.6 | 0.010 | 1.97 |

As a result of comparing Test Examples 24, 27, and 31 in Table 2, it was found that in the cells satisfying the conditions of the formulas (1) and (2), even when the BET specific surface area of the negative electrode active material is the same, the capacity deterioration rate varies depending on the component amount $I_B$ of the LiBOB skeleton of the negative electrode SEI film. From this, it was understood that the decrease in capacity due to decomposition of the electrolytic solution is not influenced only by the specific surface area of the negative electrode active material, but is complexly influenced by the component amount $I_B$ of the LiBOB skeleton and the specific surface area of the negative electrode active material.

Figure 5:
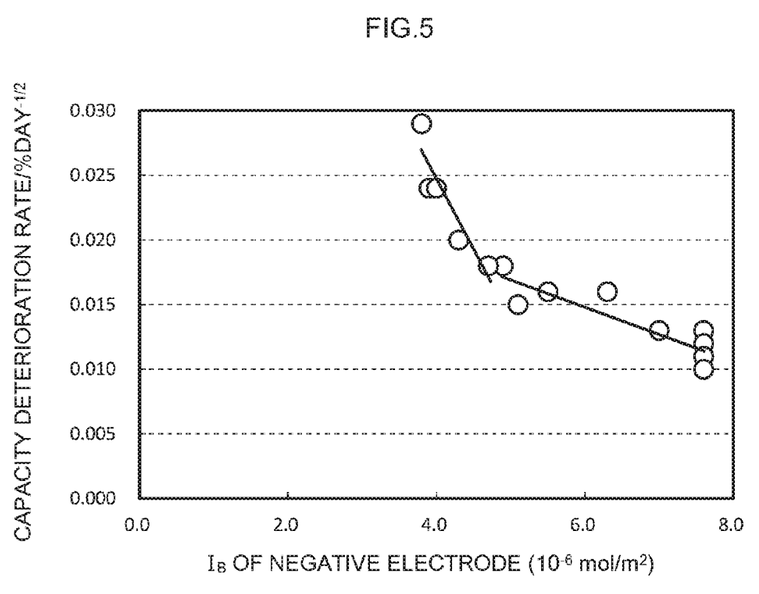
FIG. 5 is a graph showing the relationship between the component amount $I_B$ of the LiBOB skeleton and the capacity deterioration rate in the negative electrode SEI films in the lithium ion secondary cells of Test Examples 21 to 36.

Further, as shown in FIG. 5, when the relationships between the component amount $I_B$ of the LiBOB skeleton and the capacity deterioration rate obtained in Test Examples 21 to 31 were compared, it was found that the capacity deterioration rate changes greatly, with the case where the component amount $I_B$ of the LiBOB skeleton in the negative electrode SEI film is 4.3 µmol/m² serving as a boundary. Specifically, it was confirmed that when the component amount $I_B$ of the LiBOB skeleton is less than 4.3 µmol/m², the relationship between the component amount $I_B$ (x) of the LiBOB skeleton and the capacity deterioration rate (y) is "y=−0.0116x+0.0707", whereas in the case of 4.3 µmol/m² or more, the relationship is "y=−0.0019x+0.0263".

From this, it was found that in a cell satisfying the conditions of the formulas (1) and (2), deterioration of cell capacity can be more suitably suppressed by setting the component amount $I_B$ of the LiBOB skeleton in the negative electrode SEI film to 4.3 µmol/m² or more.

Meanwhile, when comparing Test Examples 21, 22, and 34 to 36, it was found that the low-temperature reaction resistance greatly changes depending on the BET specific surface area of the negative electrode active material.

Figure 6:
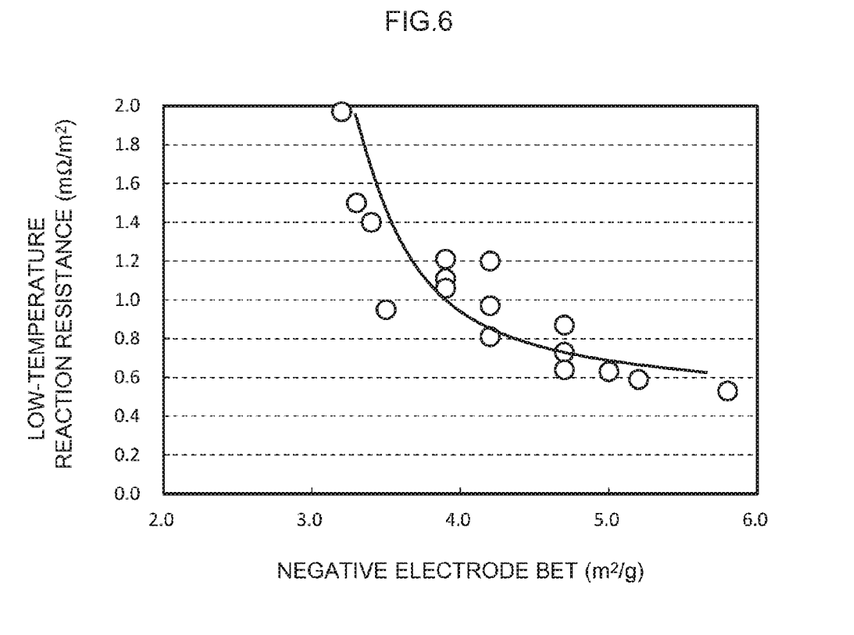
FIG. 6 is a graph showing the relationship between the BET specific surface area of the negative electrode active material and the measurement results of low-temperature reaction resistance in the lithium ion secondary cells of Test Examples 21 to 36.

Further, as shown in FIG. 6, when comparing Test Examples 21 to 31, it was found that the BET specific surface area of the negative electrode active material and the low temperature reaction resistance are in inverse proportion relationship and the low-temperature reaction resistance changes greatly, with the case in which the BET specific surface area of the negative electrode active material is 3.5 m² g⁻¹ serving as a boundary. From this, it was found that in the lithium ion secondary cell satisfying the conditions of the formulas (1) and (2), the reaction resistance was reduced more suitably by setting the BET specific surface area of the negative electrode active material to 3.5 m² g⁻¹ or more.

As shown in Test Examples 32 and 33 and FIG. 6, it was found that when the BET specific surface area of the negative electrode active material exceeds 5.0 m² g⁻¹, the low temperature reaction resistance is unlikely to decrease and the effect is saturated. Meanwhile, as the BET specific surface area of the negative electrode active material increases, the cell capacity tends to decrease due to decomposition of the electrolytic solution. From this, it was found that it is necessary to set the BET specific surface area of the negative electrode active material to 5.0 m² g⁻¹ or less.

From the above test results, it was confirmed that in the lithium ion secondary cell in which the positive electrode SEI film and the negative electrode SEI film are formed so as to satisfy the conditions of the formulas (1) and (2), by further setting the BET specific surface area of the negative electrode active material to 3.5 m² g⁻¹ or more and 5.0 m² g⁻¹ or less and setting the component amount $I_B$ of the LiBOB skeleton to 4.3 µmol/m² or more, it is possible to obtain excellent results for both the reaction resistance and the cell capacity and to improve the cell performance more suitably.

Although the present invention has been described in detail, the embodiments are merely exemplary, and the invention disclosed herein is inclusive of various changes and modifications of the above-described specific examples.

What is claimed is:

1. A nonaqueous electrolyte secondary cell comprising: a positive electrode having a positive electrode active material made of a lithium transition metal complex oxide; a negative electrode having a negative electrode active material made of a carbon material; and a nonaqueous electrolytic solution including a nonaqueous solvent and a supporting salt, wherein a negative electrode SEI film including at least a LiBOB skeleton and a fluorosulfonic acid skeleton is formed on a surface of the negative electrode active material, and a positive electrode SEI film including at least a phosphoric acid skeleton is formed on a surface of the positive electrode active material, where a value obtained by measuring a component amount of boron (b) in the negative electrode by inductively coupled plasma (ICP) emission spectroscopic analysis, normalized with respect to a BET specific surface area of the negative electrode active material, is denoted by $I_B$, a value obtained by measuring a component amount of $FSO_3^-$ in the negative electrode by ion chromatography (IC), normalized with respect to the BET surface area of the negative electrode active material, is denoted by $I_S$, and a value obtained by measuring a total amount of $PO_3F^-$, $PO_2F^-$, and $PO_4^{3-}$ in the positive electrode by ion chromatography (IC), normalized with respect to a BET surface area of the positive electrode active material, is denoted by $I_P$, the following formulas (1) and (2) are satisfied, a BET specific surface area of the negative electrode active material is 3.5 m²/g or more and 5.0 m²/g or less, and the $I_B$ is 4.3 µmol/m² or more:

$$4 \leq I_B/I_S \leq 10 \quad (1)$$

$$5 \text{ µmol/m}^2 \leq I_P \leq 15 \text{ µmol/m}^2 \quad (2).$$

2. The nonaqueous electrolyte secondary cell according to claim 1, wherein the $I_B$ is 4.3 µmol/m² to 7.6 µmol/m².

* * * * *